United States Patent Office 3,435,363
Patented Mar. 25, 1969

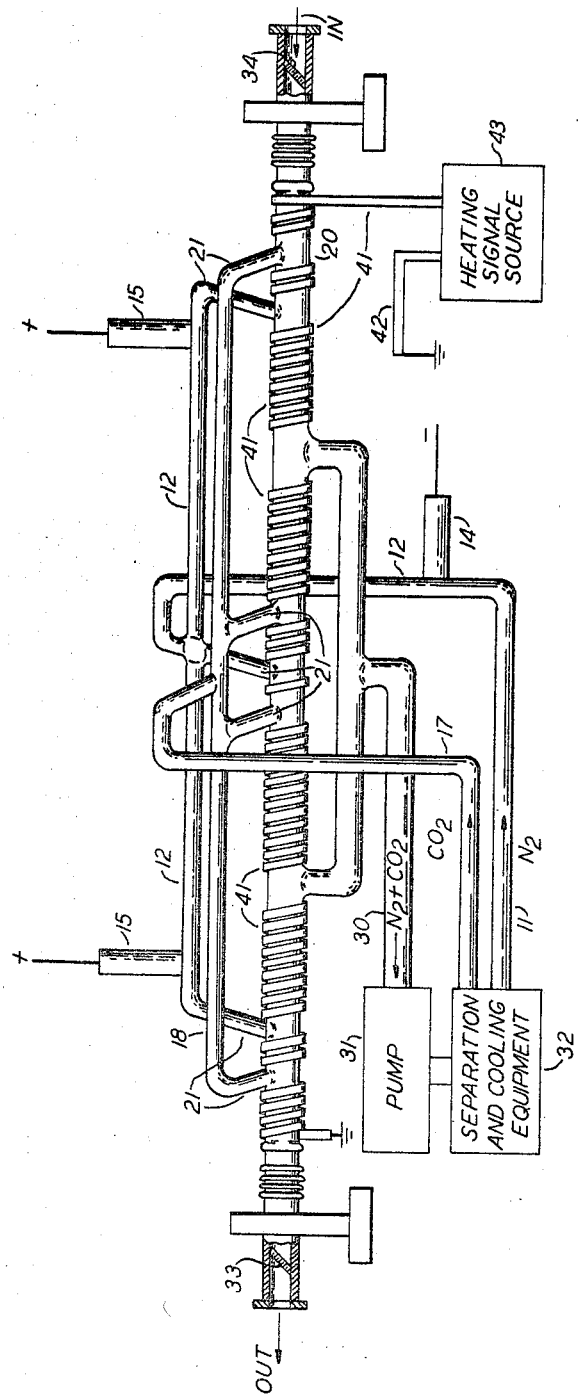

3,435,363
SELF-FOCUSING LASER
Chandra K. N. Patel, Chatham, N.J., assignor to Bell Telephone Laboratories, Incorporated, New York, N.Y., a corporation of New York
Filed Mar. 23, 1965, Ser. No. 442,022
Int. Cl. H01s *3/00;* G02b *3/12, 1/06*
U.S. Cl. 330—4.3                    9 Claims

ABSTRACT OF THE DISCLOSURE

In the gas laser disclosed, simultaneous amplification and refocusing of the transmitted radiation is obtained. The refocusing is achieved by heat applied from an external energy source through the laser side walls to establish a suitable temperature gradient for focusing action. The resonance of the lasing gas compensates for its extremely low pressure, as compared to prior art thermal gas lenses.

---

This invention relates to gas lasers.

One important use heretofore proposed for gas lasers is optical communication. It has been proposed that lasers could function as signal repeaters in outer space or within the earth's atmosphere. In the latter case, transmission would be accomplished in light pipes or in certain frequency bands, sometimes called "atmospheric windows" because they are characterized by relatively low attenuation.

Each such laser repeater would amplify the communication signal carried by the beam and presumably also be associated with apparatus for refocusing the beam. Refocusing would compensate for the spreading of the beam attributable to quantum mechanical diffraction and also for the undesired dispersive and spreading effects of the transmission medium and the laser itself.

In the copending application of Berreman and Miller, Ser. No. 379,175, filed June 30, 1964, and assigned to the assignee hereof, it is proposed that thermal gas lenses be utilized for refocusing the beam.

Such lenses would appear to involve a substantial portion of the cost of any optical communication system utilizing lasers.

Alternatively, in the copending application of Ashkin and Kogelnik, Ser. No. 400,266, filed Sept. 29, 1964, and assigned to the assignee hereof, it is proposed that a transverse gain gradient in a gas laser be utilized to focus the desired radiation. This proposal provides only limited adaptability to changing focusing requirements and is not necessarily appropriately strong for every gas laser or for every radiative transition obtainable in a particular gas.

Accordingly, it is an object of my invention to focus the stimulated radiation of a gas laser internally in an adaptable fashion.

My invention resides in my discovery that it is desirable and feasible to utilize the lasing gas of a continuous flow gas laser simultaneously as a thermal gas lens. Variable focusing is achieved by varying the external temperature of the optical cavity resonator.

One aspect of my invention resides in my recognition that useful focusing is achieved to the extent that the resonance of the lasing gas compensates for its relatively low pressure, which is much smaller than the gas pressure in a prior art type thermal gas lens. Thus, a sufficiently rapid variation in index of refraction occurs from the outer lateral surface of the laser to its axis for effective focusing action in response to a moderate temperature differential between these points.

In a preferred embodiment of my invention, thermal gradient focusing is provided in a gas laser utilizing two gases without an electrical discharge in the optical cavity resonator; and the resulting laser system is adapted to be a repeater, which preferably operates within the frequency band of an atmospheric window, such as provided by the 10.6$\mu$ transition in $CO_2$. Such a repeater obtains the efficiency and other advantages provided by a two-gas laser of the type disclosed in my copending application, Ser. No. 409,682, filed Nov. 9, 1964, and assigned to the assignee hereof.

Alternatively, a laser according to my invention may be employed as a variable coupler for the stimulated radiation.

A more complete understanding of the preferred embodiment of the invention will be obtained from the following detailed description taken in conjunction with the accompanying drawing, in which the sole figure is a partially cut away view of the preferred embodiment of the invention.

In the drawing, the laser includes a first section 12 where the high purity nitrogen that serves as the exciting gas is treated for the production of molecules in the vibrational level of the ground electronic state. In the preferred embodiment depicted, this treatment involves the subjection of the nitrogen to a D.C. discharge between electrodes 14 and 15. In this discharge, electron-ion recombinations and atom-atom recombinations as well as cascades provide the desired vibrational excitation of the nitrogen molecules.

Further structural details of this portion of the apparatus and other characteristics of the discharge are described in my above-cited copending patent application.

The excited nitrogen is made to flow out of the discharge region into the interaction region, into which is also introduced unexcited carbon dioxide, also advantageously of high purity, by way of inlet port 17 and distribution tube 18. The interaction region is enclosed within a glass tube 20. In the design being described, this tube had an inner diameter of about 25 millimeters. To improve the mixing of the exciting nitrogen and the lasing dioxide, the nitrogen and carbon dioxide are each introduced into the interaction region at a number of separate inlets 21, spaced apart along the tube 20 as shown. To keep small the amount of atomic nitrogen introduced into the interaction region, and thereby to improve the efficiency of interacting, the distance between the discharge region 12 and the point at which nitrogen enters the interaction region advantageously is made in each instance at least six centimeters to provide time for substantial completion of all the atomic and electron-ion recombinations in the nitrogen before mixing with the carbon dioxide. In the design discussed, the carbon dioxide and nitrogen flow rates were adjusted to be nearly equal with a total gas pressure of 0.8 torr in the interaction region.

The spent gases are withdrawn from the interaction region by way of the exhaust port 30 under the action of a pump 31 which controls the flow. Advantageously, the mixture evacuated is supplied to apparatus shown schematically as separation and cooling equipment 32, for separating the two components. After separation, the two gases are returned to the appropriate inlet ports of the system. The separation and cooling equipment 32 has not been shown in detail, as the techniques for such separation are known. Typically, both the separation and the cooling are adequately obtained for the purposes of the present invention by passing the mixture through a cold trap for solidification of the carbon dioxide.

In order to adapt the laser to be repeater of the straight-through amplifier type, Brewster angle windows 33 and 34, which are transparent to 10.6$\mu$ radiation, confine the interaction region. The information-modulated light beam is received at one end of tube 20, i.e., the right-hand end; and the amplified and focused information-modulated light beam is transmitted from the other end of tube 20, i.e., the left-hand end. Brewster angle windows 33 and 34 may advantageously comprise flat plates of pure silicon cemented into tube 20. Alternatively, they may comprise polycrystalline zinc sulfide. Alternatively, a pair of partially transmissive near confocal concave mirrors and suitable mirror mounts may replace Brewster angle windows 33 and 34 or else may be disposed externally thereof. Such mirrors could be pure silicon or polycrystalline zinc sulfide partially silvered or flecked with vacuum deposited gold to provide a reflectivity appropriate to the gain desired, which in any case is less than the gain desired for oscillations.

According to this specific embodiment of my invention, the interaction region comprising the tube 20 is wrapped with an electrical resistance heating tape 41, which is supplied with current from a heating signal course 43. In the specific design being discussed, tape 41 was wound as nearly edge-to-edge as possible, in view of the various ports, to provide substantially uniform heating of the surface of tube 20. An external ground return path to the other terminal 42 of source 43 was provided, as the small magnetic field produced within tube 20 does not affect the sigma state transition occurring in the $CO_2$. If a so-called pi-state transition is being utilized, or if for any other reason the heating is desired to be non-inductive, the return path to terminal 42 should include additional electrical resistance heating tape wound non-inductively with tape 41 around tube 20. For example, it could be wound on top of or underneath tape 41 around tube 20.

The theory and operation of the excitation of the lasing gas, i.e., $CO_2$, is explained in detail in my above-cited copending application. For purposes of the present invention, it is sufficient to state that laser action occurs in the $CO_2$ gas in the interaction region provided by tube 20 without any discharge occurring in tube 20. A population inversion is created between optically connected vibrational levels of the $CO_2$ gas in tube 20 by excited $N_2$ gas which was subjected to a discharge in the region 12 and which, after atomic and electron-ion recombinations, contained excited nitrogen molecules in the vibrational levels of their ground electronic states.

With the gain level in the interaction region below the oscillation threshold, the radiative transition is stimulated by the information-modulated light beam, admitted to tube 20. In a repeatered communication system, this input beam will inevitably be slightly divergent. An amplified information-modulated light beam is emitted frim the other end of tube 20. Simultaneously, the beam is focused in response to the signal from source 43. This focusing is instrumental in providing that the subsequent repeater in the system is able to gather a substantial portion of the received beam, in spite of diffractive spreading of the beam and other dispersive effects.

It is noted that atmospheric attenuation is mitigated by operation of the repeater at a carrier frequecny within the band of wavelengths, i.e., "atmospheric window," around $10.6\mu$, since atmospheric attenuation is lower in this band than for wavelengths just outside the band. The two-gas system under discussion produces laser action with a transition in $CO_2$ at $10.6\mu$, and thus is admirably suited to act as a repeater for optical communication through the atmosphere. A plurality of such repeaters spaced a few miles apart would enable long distance communication.

The thermal lens laser depicted is characterized by a thermal gradient or temperature gradient from the wall of tube 20 to the axis of tube 20. The temperature decreases smoothly and monotonically from the tube wall to the tube axis and, for the specific design discussed, is radially symmetrical. The temperature of the gas at the axis is maintained lower than the wall temperature by the continuous flow of the gases through equipment 32, where they are cooled. Advantageously, no additional cooling is found necessary.

The gas pressure within tube 20 is much lower than the gas pressures previously used in thermal gas lenses. Their gas pressures heretofore have always been greater than one atmosphere, in other words, in the range above 760 torr, which is nearly three orders of magnitude greater than the 0.8 torr pressure used in the above-described embodiment of my invention.

Without wishing to limit my invention to any particular theory, I offer the following theoretical explanation. Prior art gas pressures were needed in order to produce a practicably large radial variation in index of refraction for a given feasible temperature gradient.

In apparatus according to my invention, the resonance of the lasing gas makes the radial variation of index of refraction of the lasing gas many times greater than it would be in the absence of resonance for a given pressure and a given temperature gradient. For obtaining a given radial variation in index of refraction, the resonance of the lasing gas permits the gas pressure to be lower than otherwise possible. In other words, the resonance compensates the thermal gas lens with respect to its abnormally low gas pressure. Thus, a laser amplifier, with gas pressures more than an order of magnitude less than atmospheric pressure, readily functions simultaneously as a thermal gas lens.

Further explanation of the thermal lens effect may be found in the article, "Thermal Gas Lens Measurements," by A. C. Beck in the Bell System Technical Journal, volume 43, No. 4, part 2, pp. 1818–1820, July 1964.

A thermal lens effect has been observed in lasers using two-gas excitation arrangements of the above-described type.

The thermal lens effect has been dramatically demonstrated in a variable coupler according to my invention. A laser of the type described was provided with a convex mirror having a 520 centimeter radius of curvature in place of window 34 and a concave mirror having a 500 centimeter radius of curvature and a central aperture of 0.5 millimeter in place of window 33. The mirrors were coated to be opaque with vacuum-deposited gold; and their separation was 150 centimeters.

A direct-current excitation of the $N_2$ gas was provided by supplying nine milliamperes of current between electrodes 15 and 14. Oscillation was observed with no heating by tape 41. The current from source 43 was then increased and produced a corresponding increase in the temperature of the wall of the tube 20. The output power of the laser was observed to increase until optimum coupling was obtained and then to decrease with further increase in temperature. At a wall temperature of one hundred twenty-eight degrees centigrade, the oscillation was observed to disappear. The current from source 43 was then reduced; and at a temperature of one hundred twenty-seven degrees centigrade at the wall of tube 20 the oscillation was observed to reappear. The temperature was cycled four times; and every time the temperature for disappearance of oscillations was within a one-degree range around one hundred twenty-eight degrees centigrade. The temperature for reappearance of oscillations every time was within a one-degree range around one hundred twenty-seven degrees centigrade. Such a variable coupler can be used to compensate for errors in the original focusing or spacing of the mirrors or can be used to supply a variable power to a utilization apparatus, such as a parametric amplifier being pumped by the output radiation.

In either case, the above-described results are directly attributable to the thermal lens effect. At the flow rates present in the laser, the heating of the walls to one hundred twenty degrees centigrade will produce a thermal lens of one to three diopters, i.e., about thirty to one hundred centimeters focal length. This thermal lens can be considered as having the effect of shortening the effective focal length of a concave mirror, such as mirror 33. As the wall temperature of tube 20 is increased, a temperature is finally reached at which the effective focal length of the concave mirror becomes less than the spacing between the mirrors; and the losses become very high.

An explanation of why defocusing of the reflectors will produce high losses may be found in the article, "Generalized Confocal Resonator Theory," By G. D. Boyd and H. Kogelnik in the Bell System Technical Journal, volume 41, July 1962, pp. 1347–1369.

It should be understood that the results obtained with the variable coupler according to my invention are indicative of the amount and variability of focusing that can be obtained in a repeater according to my invention.

Various modifications of my invention are possible. Various other transitions in $CO_2$ and various other two-gas systems could be used, as disclosed in my above-cited copending patent application. Likewise, continuous flow gas lasers utilizing a discharge in the interaction region could also be used in practicing my invention, for example, by providing a sufficiently high temperature of the wall of the interaction region.

What is claimed is:

1. A laser comprising a gaseous active medium, means for forming an optical cavity including at least a portion of said active medium, means for circulating said active medium through said optical cavity and for cooling said active medium outside of said cavity, means for pumping energy into said portion of said active medium to produce a population inversion therein, means for deriving a radiative emission from said optical cavity, and means for establishing a thermal gradient in said portion of said active medium to produce a thermal lens effect upon said radiative emission.

2. A laser according to claim 1 in which the means for pumping energy into said portion of said active medium to produce a population inversion therein comprises a second gaseous medium, means forming a region spaced from said optical cavity, means for exciting said second medium in said region, and means for introducing said second medium into said optical cavity to interact with said portion of said active medium.

3. A laser comprising means forming a first region into which a first gas is introduced, means for treating said first gas while in said region to populate an excited level of said first gas, means forming a second region spaced from said first region into which the first gas is introduced after excitation and into which a second unexcited gas is introduced, the first and second gases interacting in said second region for the creation of an inverted population between a pair of optically connected levels in said second gas, and means for applying heat to said first and second gases in said second region to establish a thermal gradient shaped to produce a thermal lens effect upon transmitted radiation.

4. A laser according to claim 3 in which the total gas pressure is more than an order of magnitude less than atmospheric pressure, the resonance of the second gas rendering the heat applying means effective to produce a thermal lens effect.

5. A laser comprising means forming spaced first and second regions, means for flowing a first gas sequentially through said first and second regions, means for flowing a second gas through only the second of the two regions, means in the first region for treating the first gas to populate an excited level thereof, the first and second gases interacting in the first region to create an inverted population between a pair of optically connected levels in said second gas, and means surrounding said sceond region for producing in said first and second gases a gradient of temperatures decreasing toward a central portion of said second region.

6. A communciation repeater adapted for simultaneous focusing and amplification of an input signal, comprising means forming an optical cavity resonator, first and second gases, means for exciting said first gas outside said optical cavity, means for introducing said excited first gas and unexcited portions of said second gas into said resonator to create an inverted population between a pair of optically connected levels in said second gas thereby to enable radiation stimulatable by said input signal, means for applying said input signal to stimulate said radiation, means for abstracting a portion of said radiation from said optical cavity, means for cooling and separating said first and second gases outside of said optical cavity, and means for establishing a temperature gradient in said first and second gases in said optical cavity to focus said radiation.

7. A communication repeater adapted for simultaneous focusing and amplification of an input signal and for operation within the frequency band of an atmospheric window, comprising a laser including carbon dioxide gas as the active medium, means for forming an optical cavity resonator including at least a portion of said carbon dioxide gas, a second medium including nitrogen gas, means for exciting said nitrogen gas outside said optical cavity, means for introducing said nitrogen gas into said optical cavity to mix with said carbon dioxide gas and to create an inverted population between a pair of optically connected levels in said carbon dioxide gas thereby to enable radiation from said carbon dioxide gas at a frequency in said frequency band, means for stimulating said radiation in response to said input signal, means for transmitting a portion of said stimulated radiation, means for circulating said carbon dioxide gas and nitrogen gas including means for cooling and separating said gases outside said optical cavity, and means for heating said forming means to establish in said gases within said optical cavity a radally symmetrical gradient of temperatures decreasing toward the axis of said optical cavity.

8. A communication repeater according to claim 7 in which the total gas presure in the optical cavity resonator is appropriate for effective lasing action in the carbon dioxide gas, said lasting action rendering said gases responsive to said gradient of temperatures to produce a corresponding gradient of index refraction that is appropriate for effective focusing action.

9. A communication repeater according to claim 8 in which the total gas pressure is of the order of magnitude of 0.8 torr.

No references cited.

ROY LAKE, *Primary Examiner.*

DARWIN R. HOSTETTER, *Assistant Examiner.*

U.S. Cl. X.R.

179—170; 350—179, 160